United States Patent Office 2,907,724
Patented Oct. 6, 1959

2,907,724

MIXED ESTERS

Sylvan Owen Greenlee, Racine, Wis., assignor to S. C. Johnson & Son, Inc., Racine, Wis.

No Drawing. Application April 11, 1955
Serial No. 500,696

22 Claims. (Cl. 260—19)

This invention relates to mixed esters of two or more organic acids and a polyhydric alcohol. More particularly, this invention relates to new synthetic esters prepared from a polyhydric alcohol and a mixture of acids comprising one or more unsaturated monocarboxylic acids and an acid which is substituted with polymerizable groups.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Important resin plasticizers are the drying oils, which contain the glycerides of unsaturated acids of 18 to 22 carbon atoms, and the simpler esters of such acids. These oils are highly desirable not only for plasticizing, but also for the conversion characteristics which they impart due to their unsaturation. The present compositions provide a means of chemically uniting in each molecule one or more plasticizing or converting groups which may be derived from such drying oils together with a residue capable of being treated to form valuable insoluble, infusible compositions.

Compounds capable of accomplishing the above ends are the mixed esters prepared from one or more unsaturated acids, polyhydric alcohol, and an aryl-substituted pentanoic acid. Such compositions may be prepared, for example, by reacting 1 mol of a Diphenolic Acid, such as 4,4-bis(4-hydroxyphenyl)-pentanoic acid, with 2 mols of linoleic acid and 1 mol of glycerol.

Due to the fact that the exemplified polyhydric alcohol is trihydric, it is obvious that a maximum of 3 mols of acids may be used. In prior applications, Serial Nos. 464,607 and 489,300, filed October 25, 1954, and February 18, 1955, respectively, there are disclosed a number of compounds which are suitable for use as the aryl-substituted pentanoic acid herein contemplated. These materials, which are referred to for convenience as Diphenolic Acids, consist of the condensation products of levulinic acid and phenol, substituted phenols, or mixtures thereof. It is to be understood that the phenolic nuclei of the Diphenolic Acid may be substituted with any groups which will not interfere with the esterification reactions. For example, the nuclei may be alkylated with alkyl groups of from 1–5 carbon atoms as disclosed in Serial No. 489,300 or they may be halogenated.

The long-chain unsaturated monocarboxylic acids suitable for use in preparing the mixed esters of this invention include those containing at least about 10 carbon atoms. Illustrative of such acids are the drying oil fatty acids which normally contain from 18 to 22 carbon atoms such as acids obtained by the saponification of naturally-occurring, unsaturated vegetable oils including Chinawood oil, oiticica oil, linseed oil, soybean oil, corn oil, and cottonseed oil. The fish oils constitute another important source of operable unsaturated acids. These materials, derived principally from the menhaden and the sardine, contain the glycerides of highly unsaturated acids and have an iodine value ranging from about 130 to 190. Suitable acids may be produced by another synthetic means, for example, mixed linoleic acids may be obtained by saponifying dehydrated castor oil. Oleic acid may be used to prepare a linoleic acid by hydroxylating the same to form dihydroxystearic acid, followed by dehydration of the latter. Lower molecular weight unsaturated acids may also be used if only air-drying characteristics are desired, but those containing less than about 10 carbon atoms contribute little plasticization. An example of one of the lower plasticizing acids contemplated is undecenoic acid, a commercially available material, the decomposition product of castor oil acids.

The polyhydric alcohols used in the preparation of the subject mixed esters may be of the nonresinous type and also of the resinous type. Illustrating the nonresinous type of polyhydric alcohols are ethylene glycol, polyethylene glycols, propylene glycol, polypropylene glycols, 1,4-butane-diol, 2,5-pentane-diol, 1,6-hexane-diol, neopentyl glycol, glycerol, erythritol, pentaerythritol, polypentaerythritols, sorbitol, mannitol, alpha-methyl glucoside, polyallyl glycols, diethanolamine, triethanolamine, and tetramethylol cyclohexanol.

Illustrating the resinous polyhydric alcohols which may

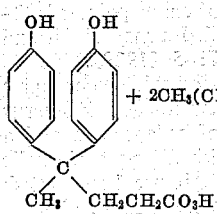 + 2CH$_3$(CH$_2$)$_4$CH=CH—CH$_2$—CH=CH(CH$_2$)$_7$CO$_2$H + 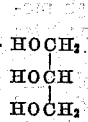 $\xrightarrow{\text{Heat}}$

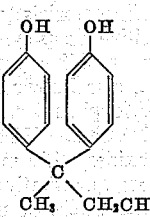

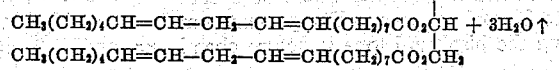

be used in the preparation of the subject mixed esters are the reaction products of di- and trihydric phenols with chlorohydrins. For example, the reaction of bis(4-hydroxyphenyl) isopropylidene with ethylene chlorohydrin or glycerol monochlorohydrin yields a resinous polyhydric alcohol. The reaction of the same dihydric phenol with epichlorohydrin or glycerol dichlorohydrin produces resinous polyhydric alcohols which in some cases contain epoxide groups in addition to the alcoholic hydroxyl groups. (The epoxide-containing products are well illustrated by the commercially avaliable Epon resins.) The preparation of these resinous polyhydric alcohols are described in U. S. Patents 2,456,408, 2,503,726, 2,615,008, 2,668,805, and 2,668,807.

Other types of resinous polyhydric alcohols are those prepared by the reaction of phenol-formaldehyde condensates with chlorohydrins. An alkyl phenol may be condensed with formaldehyde, followed by treatment of an alkaline solution of this intermediate methyol derivative with a chlorohydrin such as glycerol monochlorohydrin to form a resinous polyhydric alcohol.

The amount of acids employed to prepare the subject compositions depends upon the particular polyhydric alcohol chosen. It is obvious that to prepare a mixed ester, the maximum number of mols of acids reacted can be no greater than the number of hydroxyl groups in the alcohol. The ratio of Diphenolic Acid to unsaturated acid may be widely varied and is limited only by the desired quantum of influence of each material.

The mixed esters of this invention are conveniently prepared by direct heating at temperatures of from 190–275° C. with provision for the continuous removal of water produced by the condensation. Since the Diphenolic Acid, the long-chain unsaturated acids, and the polyhydric alcohols have boiling points which are in all cases above 190° C., water may be removed by permitting it to volatilize during esterification. Removal of the water may also be facilitated by continuously bubbling through the reaction mixture, during esterification, a stream of inert gas such as carbon dioxide or nitrogen. It is also sometimes convenient to facilitate the water removal by carrying out the reaction in a vessel provided with a condenser attached thereto through a water trap, adding a sufficient amount of a volatile water-insoluble solvent to give reflux at the esterification temperature, continually removing the water by azeotropic distillation permitting the solvent to return to the reaction mixture after having dropped the water in the water trap.

The order of addition of the various ingredients, Diphenolic Acid, long-chain unsaturated acids, and polyhydric alcohols, to each other may be varied. It is sometimes advantageous to vary the order of reaction to obtain optimum results with a particular combination of ingredients used. In the art of high temperature esterification, it is desirable to use certain esterification catalysts, and these may be used in the preparation of the subject coating compositions. Other methods of esterification, such as esterification of polyhydric alcohols with the acid chlorides, or acid interchange of the high molecular weight acids with materials such as the acetates of the polyhydric alcohols may be used.

The present mixed esters are polyhydric phenols containing within the same molecule unsaturated residues of the plasticizing type. The polyhydric phenol portion is one which is very reactive with certain materials to form compositions which are highly sensitive to polymerization to infusible, insoluble coating or molding products. Bis(4-hydroxyphenyl) isopropylidene, also known as bisphenol, is very similar to the dihydric phenol structure introduced into the subject mixed esters. When reacted with either aldehydes or epoxides, this material yields compositions which are almost quantitatively insoluble in drying oils and the simpler esters of unsaturated acids of 18 to 22 carbon atoms. The present compositions, containing the bisphenol type structure chemically bound as an integral part of a molecule which also contains the plasticizer, may be reacted with such reagents as aldehydes and epoxides to form compositions which may be polymerized to form valuable insoluble, infusible compositions. However, in the latter products, the resinous and plasticizing materials are chemically united so that there can be no physical separation thereof during processing, and the characteristics contributed by each will be found undiminished in the end product.

Having described the invention, a series of illustrative examples are presented below. These embodiments are not intended to limit the invention and should not be so construed. Quantities of materials expressed are parts by weight unless otherwise indicated.

*Example I*

A monolinseed acid ester of glycerol (a monoglyceride) was prepared in the usual manner by treating 1 mol of linseed oil with 2 mols of glycerol at 240° C. in the presence of a small amount of litharge. To 109 parts of this monoglyceride was added 157.5 parts of Diphenolic Acid (from levulinic acid and phenol) and the reaction mixture heated with continuous agitation to 210° C. and held at this temperature until the acid value was below 10. The term "acid value" as used throughout this description is defined as the number of milligrams of KOH which is equivalent to the acid content of one gram of the sample. The product was a uniformly clear, tacky, solid material.

Similarly, 1 mol of linseed oil was alcoholized with ½ mol of glycerol to give a glyceride containing 1 free hydroxyl group and 2 linseed acid ester groups. One mol of this diglyceride was treated with 1 mol of the same Diphenolic Acid to give a mixed ester from 1 mol of the diphenolic acid and 2 mols of linseed acids.

Both of these products, on reaction with formaldehyde, give compositions which when spread in thin protective coating films and heat treated for 30 minutes at 150° C. are hard, tough, and tack-free.

*Example II*

A mixture of 3 mols of a Diphenolic Acid prepared from phenol and levulinic acid and 1 mol of linseed oil fatty acids in a 3-neck flask provided with a thermometer, a mechanical agitator, and reflux condenser attached through a water trap was gradually heated to 230° C. with continuous agitation. To the molten mixture was added 1.2 mols of pentaerythritol, after which a small amount of xylene necessary to give reflux at the esterification temperature was added. The continuously agitated mixture was heated at 215–225° C. for 6 hours after which the temperature was raised to 260° C. and held at this temperature for 30 minutes, during which time a water leg vacuum of about 30 mm. pressure was applied to remove the last traces of xylene. This product had an acid value of 5.2 and a softening point of 72–75° C. (Durrans' Mercury Method, Journal of Oil and Color Chemical Association, 12, 173–5 [1929].)

This mixed ester was reacted with formaldehyde to give an excellent protective coating material. To 100 parts of the mixed ester and 40 parts of xylene was added 24.3 parts of para-formaldehyde with .71 part of oxalic acid as catalyst and the resulting mixture heated with agitation at 104° C. for approximately 1 hour. Ninety parts of this product was dissolved in a solvent composed of equal parts of butanol, butyl acetate, and methyl isobutyl ketone to give a nonvolatile content of 35% and a viscosity of A–3 (Gardner Bubble Tube Viscosimeter). A thin film of this coating flowed on to a steel panel and baked for 15 minutes at 200° C. gave a completely tack-free coating. This thin film exhibited flexibility as shown by ribboning under a knife edge. This film withstood boiling water for 2 hours, diethyl ether for 1 hour, and 10% ammonium hydroxide for 1 hour.

Example III

As in Example II, 1 mol of dipentaerythritol was esterified with 4 mols of the Diphenolic Acid from phenol and levulinic acid and 2 mols of linseed oil fatty acids to give a product having an acid value of 6.2 and a softening point of 68–70° C. This product reacted with 37% aqueous formaldehyde, using a trace of hydrochloric acid as catalyst, and finally dissolved to 30% nonvolatile in a solvent composed of equal parts of butanol, methyl isobutyl ketone, and butyl acetate to give a viscosity of A–3. Thin films of this product flowed on steel panels and baked for 15 minutes at 200° C. gave a product which withstood each of the chemicals, glacial acetic acid, 10% ammonium hydroxide, and boiling toluene, for 1 hour. This film, while being of extreme glass-like hardness, was still sufficiently flexible to ribbon freely under a knife edge.

Example IV

This example is an exact duplication of Example III except that the linseed acids were replaced with dehydrated castor oil acids. The product, on baking for 15 minutes at 200° C., again gave a very hard, tack-free film which ribboned under a knife edge and withstood 10% ammonium hydroxide for 1 hour.

Example V

To 1 mol of Chinawood oil acids heated at 225° C. was added 1.1 mol pentaerythritol with continuous agitation and held at this temperature until the acid value had reached 6. To 86 parts of this product in a 3-neck flask provided with a reflux condenser attached through a water trap was added 171.5 parts of the Diphenolic Acid prepared from phenol and levulinic acid, and the reaction mixture heated with continuous stirring to 210° C. at which point a sufficient amount of xylene was added to give continuous reflux at the esterification temperature. The reaction mixture was heated with continuous agitation at 210–220° C. for a period of 1 hour and 20 minutes, finally removing the xylene by applying a vacuum of around 30 mm. The resulting product had a softening point of 95° C.

Example VI

A mixture of 300 parts of Diphenolic Acid prepared from 2 mols of mixed meta-ortho-cresol and 1 mol of levulinic acid and having an acid value of 163, 280 parts of oleic acid and 70 parts of ethylene glycol in a 3-neck flask equipped with a mechanical agitator and a reflux condenser attached through a water trap was heated to 210° C. A sufficient amount of xylene was added to give refluxing at the esterification temperature. The reaction mixture was heated with continuous agitation until the acid value reached 10. The xylene was removed by applying a vacuum of around 30 mm. The viscosity of the final product was X+ (Gardner Bubble Viscosimeter) and the acid value was 10.8.

Example VII

A resinous alcohol was prepared by reacting 1 mol p-tert-butyl-phenol with 1.5 mols formaldehyde followed by reaction with 1.5 mols ethylene chlorohydrin. A mixture of 89.5 parts of this alcohol, 33.6 parts of linseed oil acids, and 17.2 parts of Diphenolic Acid in a 3-neck flask equipped with a mechanical agitator and a reflux condenser attached through a water trap was heated to 220° C. and held at 220–260° C. for a period of 3½ hours to give a hard brittle resin having an acid number below 5 and a softening point of 95° C.

Example VII

A mixture of 278 parts of Epon 1004 (a resinous polyhydric alcohol manufactured by Shell Chemical Corporation containing some epoxide, prepared from epichlorohydrin and bis(4-hydroxyphenyl)-isopropylidene having a softening point of 95–105° C. and an epoxide equivalent of 870–1025) and 224 parts linseed oil acids in a 3-neck flask equipped with a mechanical agitator and a reflux condenser attached through a water trap was heated at 220–224° C. for a period of 1½ hours. To this mixture 57.2 parts of Diphenolic Acid was added and the temperature maintained at 230–240° C. for an additional 2½ hours to give a hard resin having an acid value of 7 and a softening point of 63° C. To 100 parts of the mixed ester and 20 parts of xylene was added 2.2 parts of p-formaldehyde and 2 drops of 37% aqueous hydrochloric acid, and the resultant mixture heated with agitation at 104° C. for approximately 1 hour. Ninety parts of this product was dissolved in S–200 to give a nonvolatile content of 50%. A thin film of this coating flowed on to a steel panel and baked for 15 minutes at 150° C. gave a hard, flexible film.

While there are above disclosed but a limited number of embodiments of the product of the invention herein presented, it is possible to produce still other embodiments without departing from the inventive concept herein disclosed, and it is desired, therefore, that only such limitations be imposed on the appended claims as are stated therein, or required by the prior art.

I claim:

1. A new composition of matter comprising a soluble and fusible mixed ester of a polyhydric alcohol having a molecular weight of not more than about 8,000 and (1) at least one ethylenically unsaturated aliphatic monocarboxylic acid having at least about 10 carbon atoms and (2) a pentanoic acid consisting essentially of 4,4 bis-(4-hydroxyaryl)pentanoic acid wherein the hydroxyaryl radical is a hydroxyphenyl radical and is free from substituents other than alkyl groups of from 1–5 carbon atoms, the phenolic hydroxyl groups of said pentanoic acid being substantially completely unreacted.

2. The composition of claim 1 wherein the pentanoic acid consists essentially of 4,4 bis(4-hydroxyaryl)pentanoic acid wherein the hydroxyaryl radical is a hydroxyphenyl radical and is free from substituents other than alkyl groups of one carbon atom.

3. The composition of claim 1 wherein the pentanoic acid is 4,4 bis (4-hydroxyphenyl)pentanoic acid.

4. The composition of claim 3 wherein the unsaturated monocarboxylic acid is oleic acid.

5. The composition of claim 3 wherein the unsaturated monocarboxylic acid is linseed oil acids.

6. The composition of claim 3 wherein the unsaturated monocarboxylic acid is dehydrated castor oil acids.

7. The composition of claim 3 wherein the unsaturated monocarboxylic acid is Chinawood oil acids.

8. The composition of claim 3 wherein the unsaturated monocarboxylic acid is soyabean oil acids.

9. The composition of claim 3 wherein the polyhydric alcohol is glycerol.

10. The composition of claim 3 wherein the polyhydric alcohol is ethylene glycol.

11. The composition of claim 3 wherein the polyhydric alcohol is pentaerythritol.

12. The composition of claim 3 wherein the polyhydric alcohol is dipentaerythritol.

13. A new composition of matter comprising a soluble and fusible mixed ester of glycerol and (1) linseed oil acids and (2) 4,4 bis(4-hydroxyphenol)pentanoic acid.

14. A new composition of matter comprising a soluble and fusible mixed ester of pentaerythritol and (1) linseed oil acids and (2) 4,4 bis(4-hydroxyphenyl)pentanoic acid.

15. A new composition of matter comprising a soluble and fusible mixed ester of dipentaerythritol and (1) linseed oil acids and (2) 4,4 bis(4-hydroxyphenyl)pentanoic acid.

16. A new composition of matter comprising a soluble and fusible mixed ester of dipentaerythritol and (1) dehydrated castor oil acids and (2) 4,4 bis(4-hydroxyphenyl)pentanoic acid.

17. A new composition of matter comprising a soluble and fusible mixed ester of pentaerythritol and (1) Chinawood oil acids and (2) 4,4 bis(4-hydroxyphenyl)pentanoic acid.

18. A composition of matter comprising a soluble and fusible mixed ester of a resinous polymeric polyhydric alcohol having a molecular weight of not more than about 8,000 and (1) at least one ethylenically unsaturated aliphatic monocarboxylic acid of at least about 10 carbon atoms and (2) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, the phenolic hydroxyl groups of said pentanoic acid being substantially completely unreacted.

19. The composition of claim 18 wherein said resinous polymeric polyhydric alcohol is a fusible hydroxyaryl ether of a phenol-aldehyde condensate and a monochlorohydrin.

20. The composition of claim 18 wherein said resinous polyhydric alcohol is a polyether derivative of a dihydric phenol and has alternating aliphatic chains and aromatic nuclei united through ether oxygen, said resinous alcohol containing 1–2 epoxy groups and being free from functional groups other than hydroxyl and epoxy groups.

21. A new composition of matter comprising a mixed ester of the reaction product of ethylene chlorohydrin with the condensation product of formaldehyde and para-tert-butylphenol, soyabean oil acids and 4,4 bis(4-hydroxyphenyl)pentanoic acid.

22. A method of preparing a new soluble and fusible composition of matter which comprises heating to a temperature of from 190–275° C. a mixture of substantial amounts of a polyhydric alcohol having a molecular weight of not more than about 8,000 and (1) at least one ethylenically unsaturated aliphatic monocarboxylic acid having at least about 10 carbon atoms and (2) a pentanoic acid consisting essentially of 4,4 bis(4-hydroxyaryl)-pentanoic acid wherein the hydroxyaryl radical is a hydroxyphenyl radical and is free from substituents other than alkyl groups of 1–5 carbon atoms, the phenolic hydroxyl groups of said pentanoic acid being substantially completely unreacted.

No references cited.

UNITED STATES PATENT OFFICE
Certificate of Correction

Patent No. 2,907,724

October 6, 1959

Sylvan Owen Greenlee

It is hereby certified that error appears in the printed specification of the above numbered patent requiring correction and that the said Letters Patent should read as corrected below.

Column 1, following line 52, the extreme left-hand portion of the formula should appear as shown below instead of as in the patent:

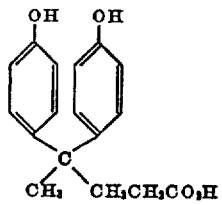

column 4, line 35, for "diphenolic acid" read —Diphenolic Acid—; column 5, line 70, for "*Example VII*" read —*Example VIII*—; column 6, line 63, for "4,4 bis(4-hydroxyphenol)pentanoic acid" read —4,4 bis(4-hydroxyphenyl)pentanoic acid—.

Signed and sealed this 17th day of May 1960.

[SEAL]

Attest:
KARL H. AXLINE,
*Attesting Officer.*

ROBERT C. WATSON,
*Commissioner of Patents.*